United States Patent Office.

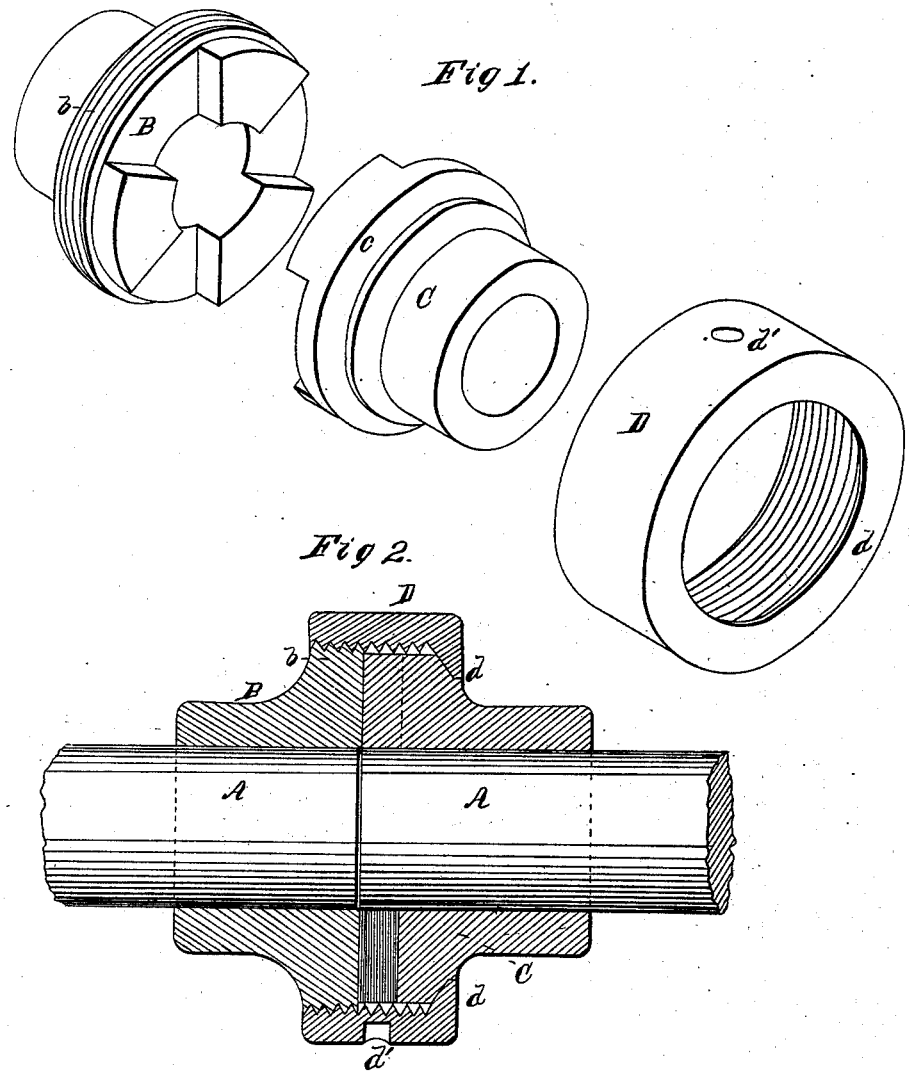

WILLIAM S. McKINNEY, OF CINCINNATI, OHIO.

*Letters Patent No. 68,768, dated September 10, 1867.*

IMPROVEMENT IN SHAFT-COUPLING.

*The Schedule referred to in these Letters Patent and making part of the same.*

TO WHOM IT MAY CONCERN:

Be it known that I, WILLIAM S. McKINNEY, of Cincinnati, in the county of Hamilton, and State of Ohio, have invented a new and useful Shaft-Coupling; and I hereby declare the following to be a full, clear, and exact description thereof, reference being had to the accompanying drawings, making part of this specification.

My invention relates to a simple, compact, and secure joint or coupling for uniting together the ends of line shafting.

Figure 1 is a perspective view of the parts of my coupling detached.

Figure 2 is an axial section showing two contiguous ends of shafting coupled or united to each other.

A A' represent the contiguous ends of two pieces of line shafting. Keyed or otherwise securely fastened to the ends of the shafts are two interlocking clutches, B C, of which one is screw-threaded exteriorly $b$, to receive the interiorly screw-threaded sleeve or band D, which band has a lip, $d$, that engages behind the shoulder $c$ of the clutch C. One or more sockets $d'$ are provided in the periphery of the sleeve for the application of a turning-wrench to fasten or unfasten the joint.

I claim herein as new, and of my invention—

The combination of the screw-threaded and lipped sleeve D with the screw-threaded clutch B and plain clutch C, as and for the purpose herein described and represented.

In testimony of which invention I hereunto set my hand.

WILLIAM S. McKINNEY.

Witnesses:
GEO. H. KNIGHT,
JAMES H. LAYMAN.